(12) United States Patent
Park et al.

(10) Patent No.: US 10,955,157 B2
(45) Date of Patent: *Mar. 23, 2021

(54) BUILDING MANAGEMENT SYSTEM WITH DISTRIBUTED DATA STORAGE AND PROCESSING

(71) Applicant: Johnson Controls Technology Company, Auburn Hills, MI (US)

(72) Inventors: Youngchoon Park, Brookfield, WI (US); Sudhi Sinha, Milwaukee, WI (US)

(73) Assignee: Johnson Controls Technology Company, Anbnrn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,207

(22) Filed: Nov. 1, 2019

(65) Prior Publication Data

US 2020/0064003 A1     Feb. 27, 2020

Related U.S. Application Data

(63) Continuation of application No. 15/409,489, filed on Jan. 18, 2017, now Pat. No. 10,480,804.

(51) Int. Cl.
*F24F 11/30*     (2018.01)
*F24F 11/62*     (2018.01)
(Continued)

(52) U.S. Cl.
CPC .............. *F24F 11/30* (2018.01); *F24F 11/54* (2018.01); *F24F 11/62* (2018.01); *G05B 15/02* (2013.01);
(Continued)

(58) Field of Classification Search
CPC ......... H04N 21/4126; H04N 21/42203; G05B 2219/2614; G05B 13/00
See application file for complete search history.

(56) References Cited

U.S. PATENT DOCUMENTS 10,480,804 B2*  11/2019  Park ........................ F24F 11/30
2011/0178977 A1   7/2011  Drees
(Continued)

OTHER PUBLICATIONS

International Search Report for International Application No. PCT/US2017/061242, dated Feb. 1, 2018, 8 pages.

*Primary Examiner* — Yves Dalencourt
(74) *Attorney, Agent, or Firm* — Foley & Lardner LLP

(57) ABSTRACT

A building management system (BMS) including device controllers configured to monitor and control one or more heating, ventilation, or air conditioning (HVAC) devices and to store and process time-series data associated with the HVAC devices. The BMS includes a BMS controller that is communicably coupled to the device controllers. The BMS controller is configured to generate and send one or more processing sub-requests to at least one of the device controllers based on a processing request requesting time-series data associated with an HVAC device. The BMS controller is configured to receive one or more processing results from the at least one of the device controllers and join the one or more processing results into a joined result. The BMS controller is configured to provide the joined result to a requesting entity. The device controllers are configured to receive and process processing sub-requests and send results to the BMS controller.

20 Claims, 8 Drawing Sheets

(51) Int. Cl.
*F24F 11/54* (2018.01)
*G05B 15/02* (2006.01)
*F24F 11/63* (2018.01)
*F24F 11/64* (2018.01)
*F24F 11/58* (2018.01)
*F24F 11/65* (2018.01)
*F24F 110/20* (2018.01)
*F24F 110/10* (2018.01)
*G05B 19/042* (2006.01)

(52) U.S. Cl.
CPC ............... *F24F 11/58* (2018.01); *F24F 11/63* (2018.01); *F24F 11/64* (2018.01); *F24F 11/65* (2018.01); *F24F 2110/10* (2018.01); *F24F 2110/20* (2018.01); *G05B 19/0426* (2013.01); *G05B 2219/2614* (2013.01)

(56) References Cited

U.S. PATENT DOCUMENTS

| | | |
|---|---|---|
| 2012/0259469 A1 | 10/2012 | Ward et al. |
| 2015/0088312 A1 | 3/2015 | Lo et al. |
| 2015/0316907 A1 | 11/2015 | Elbsat et al. |
| 2015/0355613 A1 | 12/2015 | Palmer |
| 2016/0313752 A1 | 10/2016 | Przybylski |

\* cited by examiner

900B

| ID | Type | Operation |
|---|---|---|
| 21 | 916 Logical | Round data points |
| 22 | | Determine if a first data point is greater than a second data point |
| 23 | | Determine if data points are equal |
| 24 | | Determine if a first data point is less than or equal to a second data point |
| 25 | | Determine if a first data point is greater than or equal to a second data point |
| 26 | | Determine if a first data point is not equal to a second data point |
| 27 | | Set a first time-series equal to a second-time series when a condition is false |
| 28 | | Set a first time-series equal to a second time series when a condition is true |
| 29 | 918 Statistical | Determine correlation between a first time-series and a second time-series |
| 30 | | Retrieve the "nth" smallest value from a time-series |
| 31 | | Retrieve the "nth" largest value from a time-series |
| 32 | | Assign a rank to each data point in a time-series |
| 33 | | Assign a percentile to each element in an input time-series |
| 34 | 920 Other | Perform a function on each data point of a time-series |
| 35 | | Convert an input time-series to a specified frequency |
| 36 | | Return the first "n" rows of a data element |
| 37 | | Return the last "n" rows of a data element |
| 38 | 922 Custom | Custom_1 |
| 39 | | Custom_2 |
| 40 | | Custom_3 |
| 41 | | Custom_4 |

FIG. 9B

BUILDING MANAGEMENT SYSTEM WITH DISTRIBUTED DATA STORAGE AND PROCESSING

CROSS-REFERENCE TO RELATED PATENT APPLICATION

This application is a continuation of U.S. patent application Ser. No. 15/409,489 filed Jan. 18, 2017, the entirety of which is incorporated by reference herein.

BACKGROUND

The present disclosure relates generally to data processing in a building management system (BMS). A BMS controller may store, collect, or retrieve data from sensors and actuators in a building. The BMS controller may receive a processing request to process the sensor or actuator data. In this regard, the BMS controller can itself process the sensor and actuator data to generate a result, this is known as central processing. In a central processing system each sensor and actuator constantly or periodically sends data to the BMS controller. For this reason, there is a decrease in the amount of available bandwidth in central processing system. Further, since the BMS controller stores the sensor or actuator data locally and performs all processing functions itself, the BMS controller may require a high amount of computing power and a large database to store, aggregate, and process all the sensor and actuator data.

SUMMARY

One implementation of the present disclosure is a building management system (BMS), according to some embodiments. The BMS includes device controllers, according to some embodiments. Each of the device controllers are configured to monitor and control one or more heating, ventilation, or air conditioning (HVAC) devices and to store and process time-series data associated with the one or more HVAC devices, according to some embodiments. The BMS includes a BMS controller that is communicably coupled to the device controllers, according to some embodiments. The BMS controller is configured to generate and send one or more processing sub-requests to at least one of the device controllers based on a processing request requesting time-series data associated with an HVAC device, according to some embodiments. The BMS controller is configured to receive one or more processing results from the at least one of the device controllers, according to some embodiments. The BMS controller is configured to join the one or more processing results into a joined result, according to some embodiments. The BMS controller is configured to provide the joined result to a requesting entity, according to some embodiments. The device controllers are configured to receive and process processing sub-requests and send results to the BMS controller, according to some embodiments.

In some embodiments, the BMS includes a BMS database configured to store a master-index. The master-index identifies the time-series data stored by the device controllers, according to some embodiments. The BMS controller is further configured to query the master-index of the BMS database to determine which of the device controllers stores the time-series data associated with the HVAC device, according to some embodiments. The BMS controller is further configured to send the one or more processing sub-requests to the device controllers storing the time-series data, according to some embodiments.

In some embodiments, receiving the one or more processing results includes receiving a completion message from the at least one of the device controllers. Receiving the one or more processing results includes retrieving the one or more processing results responsive to receiving the completion message, according to some embodiments.

In some embodiments, the BMS controller further configured to sort the one or more processing results responsive to a determination that the one or more processing results require sorting.

In some embodiments, the processing request requests time-series data associated with multiple HVAC devices.

In some embodiments, the device controllers each include a device database. The device controllers are further configured to store the time-series data in the device databases, according to some embodiments. The device controllers are further configured to query the device databases responsive to receiving a processing sub-request to obtain time-series data to fulfill the processing sub-request, according to some embodiments.

Another implementation of the present disclosure is a building management system (BMS), according to some embodiments. The BMS includes device controllers include processing circuits, according to some embodiments. The processing circuits are configured to receive a processing sub-request from a BMS controller that requests time-series data of a particular heating, ventilation, or air conditioning (HVAC) device, according to some embodiments. The processing sub-request includes a request for a processing operation to be performed on the time-series data, according to some embodiments. The processing circuits are configured to obtain the time-series data of the particular HVAC device, according to some embodiments. The processing circuits are configured to perform the processing operation on the time-series data, according to some embodiments. The processing circuits are configured to generate a processing result including results of the processing operation, according to some embodiments. The processing circuits are configured to send the processing result to the BMS controller, according to some embodiments. The BMS controller is configured to join processing results from each of the device controllers, according to some embodiments.

In some embodiments, the device controllers include device databases configured to store time-series data of one or more HVAC devices. Obtaining the time-series data of the particular HVAC device includes querying a device database for the time-series data of the particular HVAC device, according to some embodiments.

In some embodiments, the processing circuits are further configured to generate and send a completion message to the BMS controller responsive to generating the processing results. The processing circuits are further configured to receive a retrieval message from the BMS controller, according to some embodiments. The processing result is sent to the BMS controller responsive to receiving the retrieval message, according to some embodiments.

In some embodiments, the request indicates processing operations to be performed on the time-series data. The processing operations are associated with operation identifiers corresponding to certain processing operations, according to some embodiments.

In some embodiments, the processing circuits are further configured to generate control signals to operate the particular HVAC device. The processing circuits are further configured to provide the control signals to the particular HVAC device, according to some embodiments. The time-series data of the particular HVAC device is obtained responsive to operating the particular HVAC device based on the control signals, according to some embodiments.

In some embodiments, the processing circuits are further configured to receive processing sub-requests from the BMS controller. The processing circuits are further configured to generate a queue including the processing sub-requests, according to some embodiments. The processing circuits are further configured to perform processing operations indicated by the processing sub-requests respective of the queue, according to some embodiments.

In some embodiments, the processing circuits are further configured to receive one or more custom processing operations from the BMS controller and store the one or more custom processing operations. The processing circuits are further configured to perform one or more of the custom processing operations to generate the processing result when the processing sub-request indicates that one or more of the custom processing operations are required for generating the processing result, according to some embodiments.

Another implementation of the present disclosure is a device controller for one or more heating, ventilation, or air conditioning (HVAC) devices, according to some embodiments. The device controller includes one or more processing circuits including one or more processors and memory storing instructions that, when executed by the one or more processors, cause the one or more processors to perform operations, according to some embodiments. The operations include storing time-series data in a database, according to some embodiments. The time-series data describes operation of the one or more HVAC devices, according to some embodiments. The operations include receiving a processing sub-request from a building management system (BMS) controller, according to some embodiments. The processing sub-request includes an operation to be performed on the time-series data, according to some embodiments. The processing sub-request is one of multiple processing sub-requests provided by the BMS controller to device controllers, according to some embodiments. The operations include retrieving the time-series data from the database, according to some embodiments. The operations include performing the operation indicated by the processing sub-request on the time-series data to generate a processing result, according to some embodiments. The operations include transmitting the processing result to the BMS controller to fulfill the processing sub-request, according to some embodiments.

In some embodiments, the operations include generating and sending a completion message to the BMS controller responsive to generating the processing result. The operations include receiving a retrieval message from the BMS controller, according to some embodiments. The processing result is transmitted to the BMS controller responsive to receiving the retrieval message, according to some embodiments.

In some embodiments, the processing sub-request indicates operations to be performed on the time-series data. The operations are associated with operation identifiers corresponding to certain processing operations to perform, according to some embodiments.

In some embodiments, the operations include generating control signals to operate the one or more HVAC devices. The operations include providing the control signals to the one or more HVAC devices, according to some embodiments. The operations include obtaining the time-series data responsive to operating the one or more HVAC devices based on the control signals, according to some embodiments.

In some embodiments, the operations include receiving processing sub-requests from the BMS controller. The operations include generating a queue including the processing sub-requests, according to some embodiments. The operations include performing processing operations indicated by the processing sub-requests respective of the queue, according to some embodiments.

In some embodiments, the time-series data is retrieved from the database based on an entity identifier that identifies the time-series data associated with the one or more HVAC devices.

In some embodiments, the processing result is one of multiple processing results that are joined by the BMS controller to generate a joined result.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 9A and 9B are tables of processing operations that can be performed by the device controller of FIG. 2, FIG. 3, and FIG. 4, according to an exemplary embodiment.

DETAILED DESCRIPTION

Overview

Figure 1:
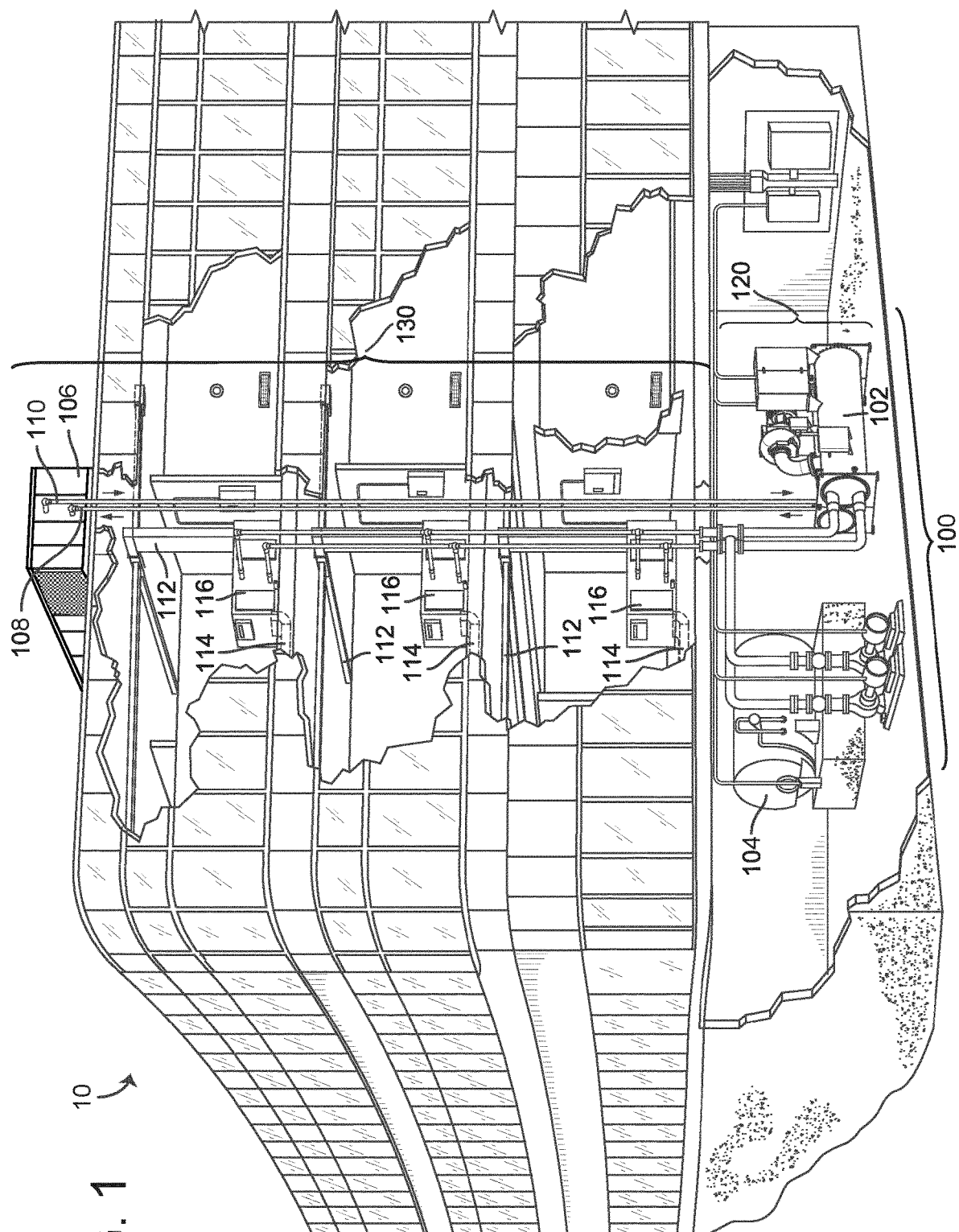
FIG. 1 is a schematic drawing of a building equipped with a HVAC system, according to an exemplary embodiment.

Referring generally to the FIGURES, systems and methods for distributing data storage and processing in a BMS are shown, according to various exemplary embodiments. A BMS controller can be used to receive a processing request and distribute the processing request among various other controllers in a building. In this regard, processing can be performed locally on individual controllers rather than centrally on the BMS controller. Further, the BMS controller can subdivide the processing request. In this regard, one processing task can be broken down into one or more processing tasks. These processing tasks, otherwise known as "processing sub-requests," can be distributed among various controllers in the building. Each controller can generate a result for the processing sub-request and report the result to the BMS controller. The BMS controller can join the results to generate a single result.

In some embodiments, the data being processed is time-series data generated by various sensors, actuators, and other building equipment. This data may be stored locally on a device controller immediately responsible for controlling the sensor, actuator, or other building equipment. In various embodiments, the device controller includes and/or is coupled to a database that the device controller can use to store the data. It should be understood that a "device controller" may refer to a controller responsible for controlling a sensor or actuator, receiving data from the sensor or actuator and storing the data in a database, and generating commands for the sensor or actuator. As referred to herein, "device controller" may refer to device controller A 212 and/or device controller 216 as described with reference to FIGS. 2-4. Rather than pushing this time-series data to a central controller (i.e., the BMS controller) for processing and storage, the BMS controller can cause the device controller to process the time-series data in place of the BMS controller. Further, each device controller can send the result of the local processing to the BMS controller.

Using a system to locally process data can result in various benefits for the BMS. In one regard, the BMS can handle a greater number of processing requests since each processing request is distributed, and not actually performed by a central BMS controller. Further, the processing power of the central BMS controller can be downscaled, resulting in energy savings, lower equipment costs, etc. Various networks in a building can become "clogged" with the excessive transmission of sensor or actuator data from the device controller to the central BMS controller in a central processing system. Rather than retrieve time-series data from a sensor or actuator, the central BMS controller can simply retrieve the results of a local processing request. In this regard, bandwidth is conserved. In some embodiments, distributing processing across multiple controllers removes any single point of failure. For example, sensor data may be stored across multiple databases. If one of the databases, or controllers responsible for the database, experience a fault, the sensor data can be retrieved form a different database.

Building Management System and HVAC System

Referring now to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Systems and Methods for Distributed Storage and Processing

Figure 2:
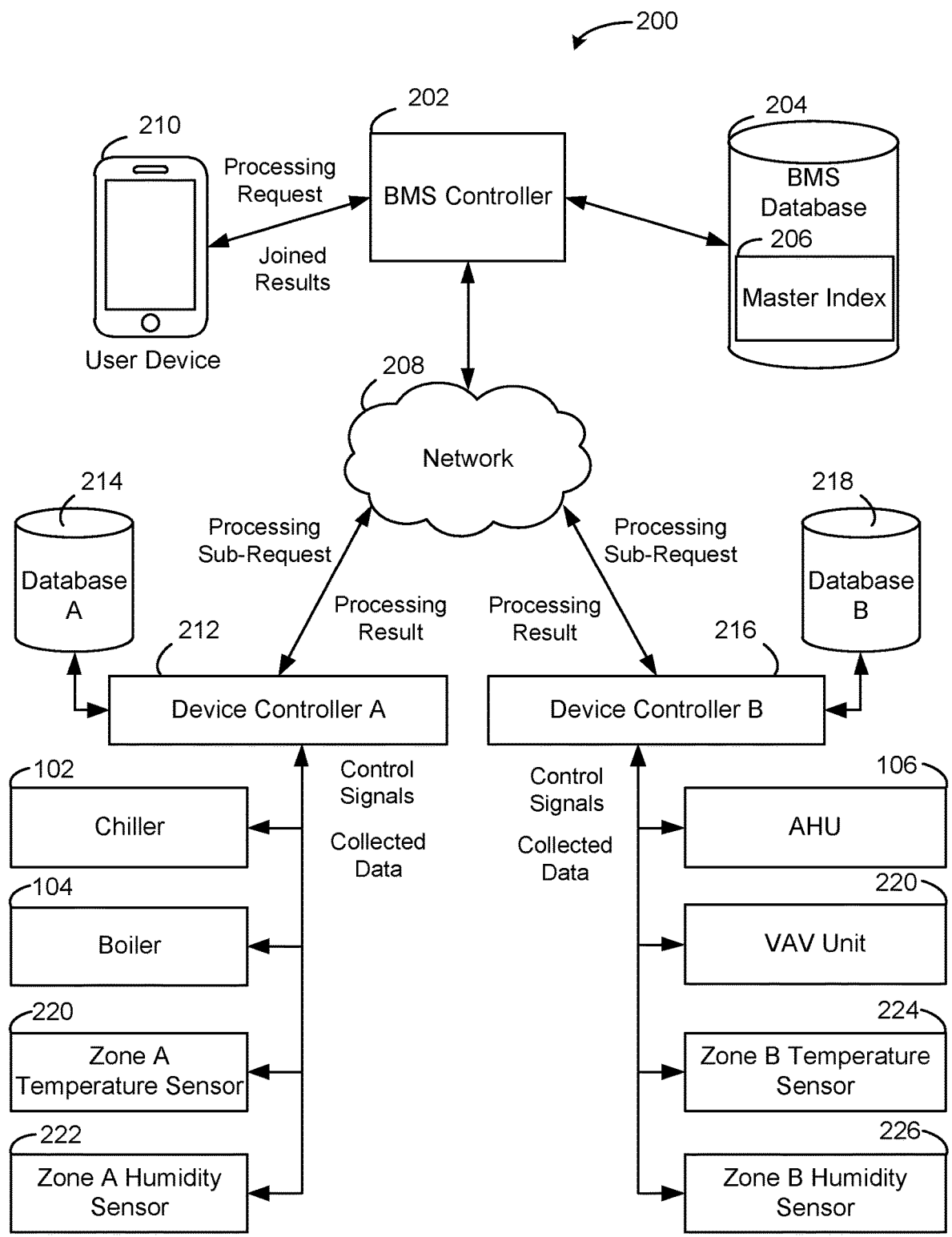
FIG. 2 is a diagram of a BMS controller connected to device controllers, a BMS database, and a user device via a network, according to an exemplary embodiment.

Referring now to FIG. 2, a block diagram of a building computing system is shown, according to an exemplary embodiment. System 200 includes various controllers, databases, and devices configured to distribute data processing and data storage. In this regard, system 200 may store data for one or more sensors or actuators in various databases in system 200. Further, each database may have an associated device controller configured to store data in the database, retrieve data from the database, and process the data retrieved from the database.

System 200 can be configured to receive a processing request to process data stored in the various databases. System 200 can subdivide the processing request based on the location of the data (i.e., the database storing the data)

and cause the controllers associated with the databases storing the data to remotely process the data and report the processing results to a central controller. The central controller can join the processing results and report the processing results to an entity or device that makes the processing request. System 200 is shown to include a BMS controller (e.g., a central controller or system), a BMS database 204, a network 208, a user device 210, a device controller A 212 with an associated database A 214, and a device controller B 216 with an associated database B 218.

BMS controller 202 can be a computer system (e.g., one or more processors coupled to one or more memory devices). In some embodiments, BMS controller 202 is a computer system running METASYS®, VERASYS®, and/or other building management software. BMS database 204 is shown to be connected to BMS controller 202. In some embodiments, BMS controller 202 is at least one or a combination of a controller, a thermostat, a sensor, and/or a actuator that can process data. In some embodiments, BMS controller 202 is a Network Automation Engine (NAE), a Network Integration Engine (NIE), an Advanced Field Equipment Controller (FAC), a Network Control Engine (NCE) and/or any other network engine or controller. In various embodiments, device controller A 212 and device controller B 216 are a laptop, a desktop, a server, and/or any other computing device. BMS database 204 can be communicably coupled to BMS controller 202 as an external database or a physical component of BMS controller 202.

BMS database 204 is shown to include master-index 206. Master-index 206 can store the locations of data in system 200. For example, master-index 206 may indicate that data for a certain sensor is stored in database B 218 while data for a certain actuator is stored in database A 214. In this regard, BMS controller 202 may query BMS database 204 for master-index 206 in order to look up the physical storage location of data in system 200.

In various embodiments, BMS database 204 includes two databases and/or any number of databases. Further, the databases may be configured to handle failovers. In some embodiments, one database assumes the role of the second database when the first database fails. Further, if one of the databases (e.g., database A 241 or database B 218) and/or controllers (device controller A 212 or device controller B 216) fail, any time series data collected by the controllers or stored by the databases may be forwarded on to one or both of the two databases of BMS database 204.

Device controller A 212 and/or device controller B 216 can be any controller, thermostat, sensor, and/or actuator that can process data. In some embodiments, device controller A 212 and device controller B 216 are a Network Automation Engine (NAE), a Network Integration Engine (NIE), an Advanced Filed Equipment Controller (FAC), a Network Control Engine (NCE) and/or any other network engine or controller. In various embodiments, device controller A 212 and device controller B 216 are a laptop, a desktop, a server, and/or any other computing device.

Device controller A 212 is shown to be communicably coupled to various components of building 10 (e.g., chiller 102 and boiler 104), building 10 and these components are described with reference to FIG. 1. As shown, device controller A 212 can generate control signals for chiller 102, boiler 104, zone A temperature sensor 220, and zone A humidity sensor 222. Device controller A 212 is shown to be communicably coupled to zone A temperature sensor 220 and zone A humidity sensor A 222. Zone A temperature sensor 220 may be configured to measure an ambient temperature value of a particular zone of building 10 (e.g., "zone A"). Zone A humidity sensor 222 may be configured to measure a humidity value (e.g., relative humidity) of zone A. Device controller A 212 can be configured to receive the humidity value and/or the ambient temperature value of zone A from zone A temperature sensor 220 and/or zone A humidity sensor 222. In some embodiments, device controller A 212 can be configured to control environmental conditions of building 10 and/or various zones of building 10 (e.g., zone A) by generating control signals for chiller 102 and/or boiler 104. Further, data associated with chiller 102, boiler 104, zone A temperature sensor 220, and/or zone A humidity sensor 222 can be collected by device controller A and stored in database A 214. In some embodiments, the collected data includes various temperature values, humidity values, pressure values, flowrate values, setpoints and/or other data.

Similar to device controller A 212, device controller B 216 is shown to be communicably coupled to various components of building 10 (e.g., AHU 106 and VAV unit 116). Building 10, AHU 106, and VAV unit 116 are described with reference to FIG. 1. As shown, device controller B 216 can generate control signals for AHU 106 and VAV unit 116. Device controller B 216 is shown to be communicably coupled to zone B temperature sensor 224 and zone B humidity sensor A 226. Zone B temperature sensor 224 may be one instantiation of Zone A temperature sensor 220. Likewise, zone B humidity sensor 226 may be one instantiation of zone A humidity sensor 222. Zone B temperature sensor 224 and zone B humidity sensor 226 may be associated with a particular zone of building 10 (e.g., "Zone B"). In various embodiments, device controller B 216 collects data such as temperature values, humidity values, airflow values, etc. from AHU 106, VAV unit 116, zone B temperature sensor 224, and/or zone B humidity sensor 226. Device controller B 216 can be configured to store the collected data in database B 218. Further, device controller B 216 can be configured to generate signals to control AHU 106 and/or VAV unit 116 to maintain certain environmental conditions.

In some embodiments, BMS database 204, database A 214, and database B 218 are key-value databases. In this regard, the databases may store a hash or dictionary. The dictionary or hash may refer to an array and/or other data structure stored by the database. In this regard, the hash or dictionary may store a collection of objects or records that in turn store multiple fields, each field containing data. A key can be used to query the database for data stored in the record. For example, database A 214 may store time-series data gathered from an entity such as a sensor. In order to retrieve the time-series data, the value, a key may be used. The key may be an entity identifier identifying a certain entities data (e.g., a certain sensor or actuator). Continuing the example, a key may be a string or other data element such as, "temperature_sensorA." The data gathered and stored in database A 214 may be retrieved by searching the key, "temperature_sensorA." In various embodiments, the databases may be a non-relational database (NoSQL), a relational database (RDB), and/or any other type or combination of database types.

In some embodiments, network 208 communicably couples the devices, systems, and servers of system 200. BMS controller 202 can be configured to communicate with various components of system 200 via network 208. In some embodiments, BMS controller 202 can send and/or receive data to and/or from device controller A 212 and/or device controller B 216 via network 208. In some embodiments, network 208 is at least one of and/or a combination of a Wi-Fi network, a wired Ethernet network, a Zigbee network, a Bluetooth network, and/or any other wireless network. Network 208 may be a local area network or a wide area network (e.g., the Internet, a building WAN, etc.) and may use a variety of communications protocols (e.g., BACnet, IP, LON, etc.). In some embodiments, network 208 is and/or includes a Field Controller bus (i.e., FC bus) and/or a Sensor Actuator bus (i.e., SA bus). Network 208 may include routers, modems, connectors, network switches, and/or any other component necessary for implementing network 208. Network 208 may be a combination of wired and wireless networks. In various embodiments, network 208 includes RS485 communication, RS232 communication, USB communication, fire wire communication, and/or any other communication type.

System 200 is shown to include user device 210. User device 210 can be a mobile device, a laptop computer, a desktop computer, and/or any other computing device. Further, user device 210 can be any input/output device for BMS controller 202. In this regard, user device 210 can be and/or include a touch screen, a display, a keyboard, a keypad, and/or any other input/output device. User device 210 can be configured to send a processing request to BMS controller 202 and receive the results of the processing request, the joined results, from the BMS controller 202. In this regard, user device 210 can be communicably coupled to BMS controller 202. In some embodiments, user device 210 is a physical extension of BMS controller 202 (e.g., a keyboard and a display). In some embodiments, user device 210 is a computing device that communicates via a network (e.g., network 208) and/or adhoc (e.g., adhoc wireless or adhoc wired) with BMS controller 202 to send a processing request to BMS controller 202 and receive a joined result from BMS controller 202.

System 200 is shown to include device controller A 212 and device controller B 216 each respectively coupled to database A 214 and database B 218. Device controller A 212 and device controller B 216 can be configured to store data in and/or retrieve data from database A 214 and database B 218 respectively. In this regard, device controller A 212 can process the data stored in database A 214 and device controller B can process the data stored in database B 218. Both device controller A 212 and device controller B 216 can receive a processing sub-request from BMS controller 202. The processing sub-request received by device controller A 212 may require device controller A 212 to process data stored in database A 214 while the processing sub-request received by device controller B 216 may require device controller B 216 to process data stored in database B 218. Based on the result of the processing performed by device controller A 212, device controller A can send the processing result, the result of processing data for the processing sub-request, to BMS controller 202 via network 208 and/or any other communications means. Similarly, device controller B can send the processing result, the result of processing data for the processing sub-request received by device controller B, to BMS controller 202 via network 208. In various embodiments, the processing sub-request identifies a device (e.g., entity A, entity B, etc.), a start-time and an end-time of a time-series data sequence for the identified device, one or more operations, and/or a sequence for the operations (e.g., single operation, parallel operations, pipeline operations, etc.)

Referring again to BMS controller 202 and user device 210, BMS controller 202 can be configured to receive the processing results from device controller A 212 and device controller B 216. In this regard, BMS controller 202 can be configured to join the two processing results and send the joined results to user device 210. It is contemplated that any number of device controllers (e.g., device controller A 212 and device controller B 216) can be communicably coupled to network 304. For this reason, BMS controller 202 can generate any number of processing sub-requests for any number of device controllers connected to network 208. Further, BMS controller 202 can receive any number of processing results from any number of device controllers communicably coupled to network 208, and join the results for delivery to user device 210.

Figure 3:
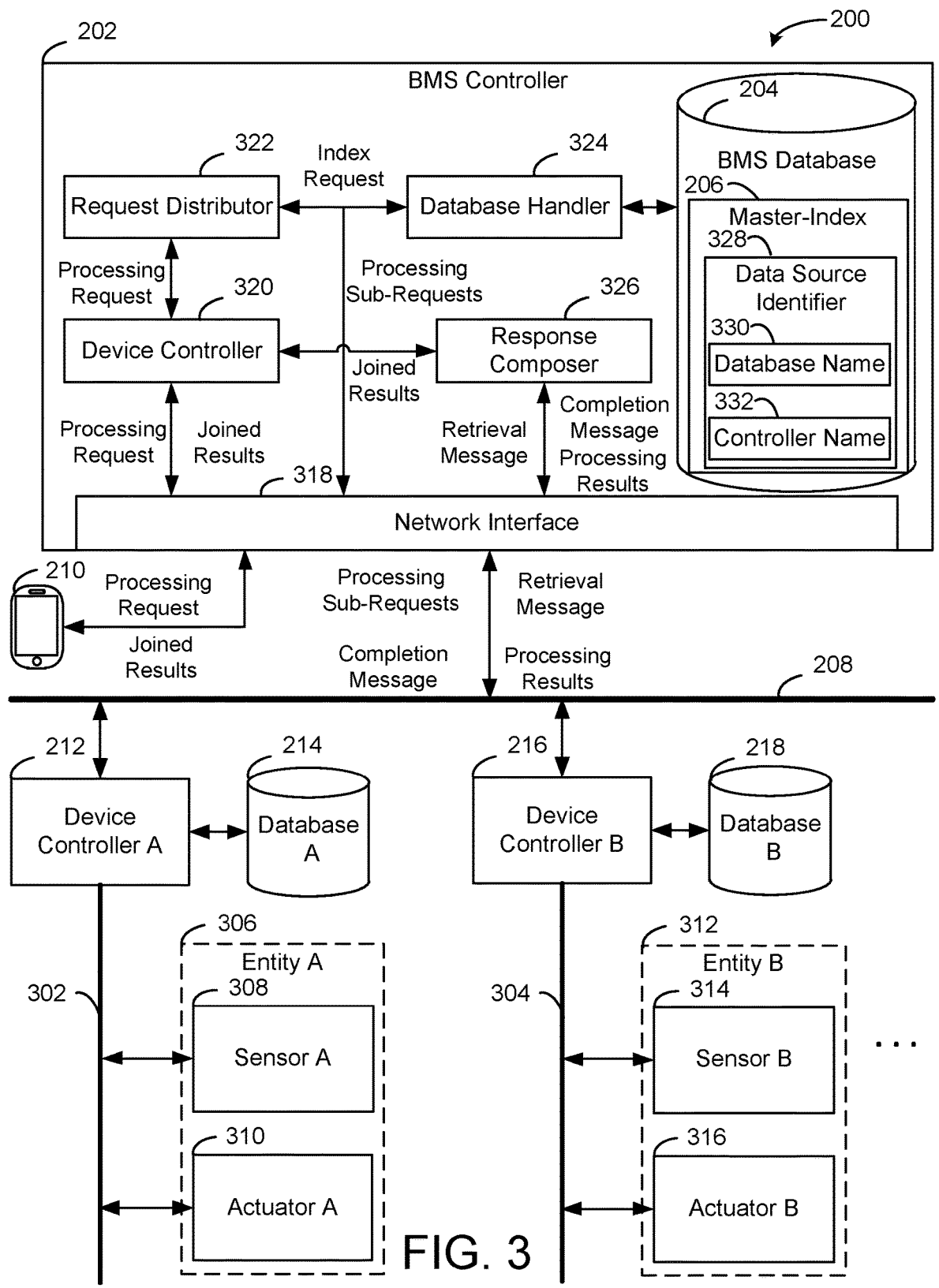
FIG. 3 is a diagram of a BMS controller and the system of FIG. 2 in greater detail, according to an exemplary embodiment.

Referring now to FIG. 3, system 200 and BMS controller 202 are shown in greater detail, according to an exemplary embodiment. As described with reference to FIG. 2, system 200 includes BMS controller 202, BMS database 204, network 208, user device 210, device controller A 212, database A 213, device controller B 216, and database B 218. System 200 is shown to further include entity A 306 communicably coupled to device controller A 212 via network 302. Entity A is shown to be and/or include sensor A 308 and actuator A 310. Similarly, system 200 is shown to include entity B 312 communicably coupled to device controller B 216 via network 304. It is understood that entity A 306 and entity B 312 are not limited to sensor A 308, sensor B 314, actuator A 310, and actuator B 316. Entity A 306 and entity B 312 may include any HVAC device as well as any other computing device. Entity A 306 and entity B 312 may include one or more AHUs, one or more air conditioner units (AC units), one or more heat pumps (HPs), and/or any other building device or system.

Network 302 and network 304 may each be a communications bus and/or network controlled by device controller A 212 and device controller B 216 respectively. In various embodiments, networks 302 and 304 are the same type of network as network 208 and/or one of the possible networks that 208 may be in various embodiments, as described with reference to FIG. 2. In various embodiments, network 302 and network 304 are specific networks operated by device controller A 212 and device controller B 216 for each device controllers' respective entities (e.g., entity A 306 and entity B 312).

Referring now to device controller A 212, device controller A 212 may be configured to manage network 302. Device controller A 212 can be configured to generate commands for sensor A 308 and actuator A 310. In some embodiments, the commands are a command to collect data, a command to turn on or off, a command to open or close a valve, a command to run a fan at a certain speed, and/or any other command. Device controller A 212 may retrieve data from entity A 306 via network 302 periodically and/or asynchronously. Further, device controller A 212 may receive pushed data from entity A 306 via network 302 periodically and/or asynchronously. Device controller A 212 can be configured to store any received and/or retrieved data associated with entity A 306 in database A 214. It should be noted that the discussion regarding device controller A 212, database A 214, network 302, and entity A 306 can be applied to device controller B 216, network 304, database B 218, and entity B 312 as well as any other device controller, database, network, and entity communicably coupled to BMS controller 202 via network 208. In this regard, device controller B 216, database B 218, network 304 and entity B 312 may be a unique and/or the same instantiation of device controller A 212, database A 214, network 302, and entity A 214.

Referring again to BMS controller 202, BMS controller 202 is shown in greater detail. BMS controller 202 is shown to include various components necessary for performing distributed data processing. BMS controller 202 is shown to include network interface 318, device controller 320, request distributor 322, database handler 324, and response composer 326. BMS controller 202 is also shown to include BMS database 204 as described with reference to FIG. 2. BMS controller 202 may be configured to include various processing and memory components necessary for implementing the various components of BMS controller 202 as either hardware circuits and/or software modules.

The processor of BMS controller 202 can be a general purpose or specific purpose processor, an application specific integrated circuit (ASIC), one or more field programmable gate arrays (FPGAs), a group of processing components, or other suitable processing components. The processor can be configured to execute computer code and/or instructions (e.g., device controller 320, request distributor 322, database handler 324, response composer 326, etc.) stored in a memory device of BMS controller 202 or received from other computer readable media (e.g., CDROM, network storage, a remote server, etc.).

The memory device of BMS controller 202 can include one or more devices (e.g., memory units, memory devices, storage devices, etc.) for storing data and/or computer code for completing and/or facilitating the various processes described in the present disclosure. The memory device can include random access memory (RAM), read-only memory (ROM), hard drive storage, temporary storage, non-volatile memory, flash memory, optical memory, or any other suitable memory for storing software objects and/or computer instructions. The memory device can include database components, object code components, script components, or any other type of information structure for supporting the various activities and information structures described in the present disclosure. The memory device can be communicably connected to the processor of BMS controller 202 that can perform one or more processes described herein. In various embodiments, device controller 320, request distributor 322, database handler 324, and response composer 326 can each have their own processor and memory device as described with reference to BMS controller 202. In various embodiments, the components are software modules stored on the memory device of BMS controller 202 and executed on the processor of BMS controller 202.

Network interface 318 is configured to facilitate communication with various devices and controllers for BMS controller 202. In FIG. 3, network interface is shown to communicate with user device 210. Network interface 318 may receive a processing request from 210 and provide the result of the processing request, the joined result, to user device 210. Network interface 318 is shown to be coupled to device controller 320. In this regard, network interface 318 is configured to communicate with device controller 320. In some embodiments, network interface 318 provides a processing request received from user device 210 to device controller 320. Further, network interface 318 can provide the joined results that it receives from device controller 320 to user device 210.

Referring now to device controller 320, device controller 320 is configured to facilitate communication with user device 210. In this regard, device controller 320 may control network interface 318 and/or cause network interface 318 to communicate with user device 210. In this regard, device controller 320 may generate various display screens and/or otherwise manipulate the joined results it receives from response composer 326 for visual display on user device 210. Device controller 320 is shown to be communicably coupled to response composer 326 and request distributor 322. Device controller 320 can be configured to provide any processing request it receives from user device 210 via network interface 318 to request distributor 322.

Request distributor 322 can be configured to receive a processing request from device controller 320 and generate one or more processing sub-requests for the processing request. Request distributor 322 can be communicably coupled to database handler 324. In this regard, request distributor 322 can send an index request to database handler 324 and receive master-index 206 and/or a portion of master-index 206.

Request distributor 322 may use master-index 206 to generate one or more processing sub-requests. The processing sub-request may require various operations to be performed on various time-series and/or other types of data stored in database A 214, database B 218, and in any other storage medium and/or database. Request distributor 322 may use data source identifier 328 to identify an entity (e.g., entity A 306 and/or entity B 312) that has generated the data. Request distributor 322 can further identify the database which stores some and or all of the data needed to be processed based on database name 330 associated with the database. Further, request distributor 322 can identify the controllers (e.g., device controller A and device controller B) which are responsible for the data. Based on the controller name, the database location, and the entity that has generated the data, request distributor 322 can generate one or more processing sub-requests for the processing request. Request distributor 322 can be configured to send the processing sub-requests to network interface 318 for delivery to device controller A 212 and/or device controller B 216 via network 208.

In various embodiments, the processing sub-request generated by request distributor 322 include a message to process data for a certain entity (e.g., entity A 306 or entity B 312), include the location of the data (e.g., database A 214 or database B 218) and include an destination address (e.g., device controller A 212 and device controller B 216). Further, the processing sub-request can include one or more processing operation commands. These operation commands may be various operations to manipulate data. These operations may include cleanse operations, fill operations, aggregate operations, custom operations and/or any other data processing operation. These and other types of operations are described further in FIG. 9.

Database handler 324 can be configured to identify an entity associated with a data source identifier 328, a database name 330, and a controller name 332 for each index request it receives from request distributor 322. Database handler 324 can be configured to query BMS database 204 based on the index request. In some embodiments, the index request includes a data source identifier (e.g., data source identifier 328). In this regard, database handler 324 can be configured to query BMS database 204 for a database name 330 and a controller name 332 associated with a data source identifier it receives via the index request. For this reason, database handler 324 may match a received data source identifier via the index request to data source identifier(s) 328 stored in master-index 206.

Response compose 326 can be configured to retrieve processing results from device controller A 212 and device controller B 216 via network 208 and network interface 318. In this regard, response composer 326 can be configured to compose (i.e., generate) the joined results based on the processing results it receives from device controller A 212 and device controller B 216. In some embodiments, after processing sub-requests are sent to device controller A 212 and device controller B 216, response composer 326 waits for a completion message to be received from at least one of device controller A 212 and device controller B 216. Upon receive a completion message, response composer 326 can be configured to retrieve a processing result from the device controller (e.g., device controller A 212 and device controller B 216) that generates and sends the completion message to response composer 326. In some embodiments, response composer 326 sends a retrieval message to the device controller it has received the completion message from. The retrieval message may cause the device controller to send its processing result to response composer 326.

Once response composer 326 has received all of the processing results from the device controllers (e.g., device controller A 212 and device controller B 216), response composer 326 can join the processing results. In various embodiments, response composer 326 receives the processing results out of order, in this regard, response composer 326 can be configured to sort the received processing results before and/or after the results have been joined. In various embodiments, response composer 326 maintains a sorting list for each processing request which identifies in what manner the processing results need to be joined and/or sorted.

In some embodiments, joining the processing results includes concatenating the processing results. For example, the processing results may include a first time-series data set of zone temperatures received from device controller A 212 and a second time-series data set of zone temperatures from device controller B 216. In some embodiments, the first time-series data set refers to the zone temperature between 1 P.M. and 2 P.M. on a certain day in the zone while the second time-series data set refers to the zone temperature between 2 P.M. and 3 P.M. on the same day in the same zone. In this example, response composer 326 may be configured to sort the time-series data sets and concatenate the time series data sets together so that the joined result are the zone temperatures from 1 P.M. to 3 P.M. Sorting may refer to concatenating the first time-series data set with the second time-series data set rather than concatenating the second time-series data set with the first time-series data set. If the second time-series data set were to be concatenated with the first time-series data set, the zone temperature would not be continuous, that is, the joined result, when read from lowest time of the data to highest time, would read temperature values from 2 P.M. to 3 P.M. to 1 P.M. to 2 P.M.

In various embodiments, joining the results includes generating a single data element from and/or including one or more processing sub-requests. For example, a first processing result may be received by response composer 326 which includes the zone temperatures of a first zone for a certain day. Response composer 326 may receive a zone temperatures of a second zone for the same day. Response composer 326 may generate a single data element which includes the two processing results, temperatures of two different zones on the same day (e.g., the joined results) for delivery to device controller 320 and ultimately user device 210. This joined result may allow a user of user device 210 to view and compare the zone temperatures of the first zone and the second zone. Various other joining and sorting operations are contemplated. The joining and sorting operation examples shown are only particular examples and are used to exemplify the function and structure of response composer 326.

Figure 4:
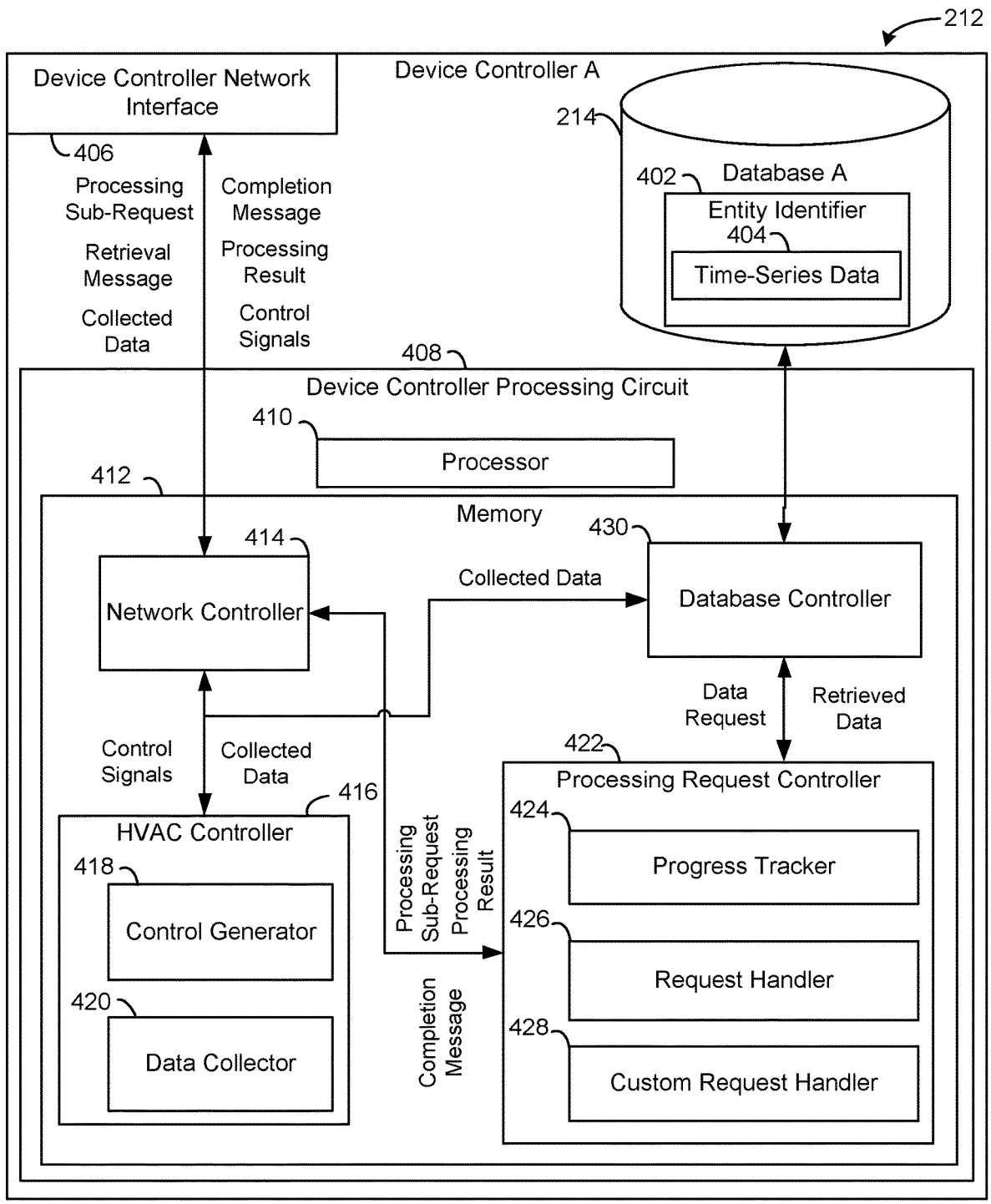
FIG. 4 is a diagram of a device controller of FIG. 2 and FIG. 3, according to an exemplary embodiment.

Referring now to FIG. 4, device controller A 212 is shown in greater detail. In various embodiments, device controller B 216 and/or BMS controller 202 embody some and/or all of the components of device controller A as described with reference to FIG. 4. Further, device controller B 216 and/or BMS controller 202 can perform some and/or all of the functions and processes of device controller A 212 as described with reference to FIG. 4. It should be understood that any computing component of system 200 as described with reference to FIGS. 2 and 3 can embody device controller A 212 and can perform some and/or all of the functions of device controller A 212.

Referring more particularly to device controller A 212, device controller A 212 is shown to include device controller network interface 406, database A 214 as described with reference to FIGS. 2 and 3, and device controller processing circuit 408. Device controller network interface 406 can facilitate communication with BMS controller 202 via network 208 and entity A 306 via network 302. Device controller network interface 406 can be configured to communicate with a Wi-Fi network, a wired Ethernet network, a Zigbee network, a Bluetooth network, and/or any other wireless and/or wired network. Device controller network interface 406 can be configured to communicate via a local area network and/or a wide area network (e.g., the Internet, a building WAN, etc.) and may use a variety of communications protocols (e.g., BACnet, IP, LON, etc.). In some embodiments, network 208 can communicate via an FC bus and/or an SA bus. Device controller network interface 406 can be configure d to control, generate, and/or otherwise maintain network 302. Device controller network interface 406 can include one or more wireless transceivers (e.g., a Wi-Fi transceiver, a Bluetooth transceiver, a NFC transceiver, a cellular transceiver, etc.).

Device controller network interface 406 can perform any encoding, decoding, modulating, demodulating, and/or other necessary data and/or signal processing operations necessary for sending data to and/or receiving data from network 208 and/or network 302. Device controller network interface 406 can receive a sub-request and a retrieval message from BMS controller 202 via network 302. Device controller network interface 406 can be configured to receive a processing sub-request and a retrieval message from BMS controller 202 via network 208. Device controller network interface 406 may send the processing sub-request and the retrieval message to network controller 414 for distribution among the various components of memory 412. Further, device controller network interface 406 can be configured to receive collected data from entity A 306. In some embodiments, the collected data is sensor data (e.g., temperature data, humidity data, air flow data, pressure data, etc.) collected by sensor A 308. The collected data may be actuator data (e.g., valve positions, air quality values, motor speeds, stepper motor positions, Electronic Expansion Valve (EEV) positions, temperature data, humidity data, compressor data, compressor suction pressures and temperatures, compressor discharge line pressures and temperatures, etc.) collected by actuator A 310. In various embodiments, the collected data is time stamped by device controller network interface 406, network controller 414, and/or any other component of device controller A 212. In some embodiments, that collected data itself is time stamped by whatever sensor or actuator (e.g., entity A 306) has sent the data to device controller network interface 406.

In some embodiments, device controller network interface 406 is configured to send a completion message and a processing result to BMS controller 202 via network 208. In this regard, device controller network interface 406 may receive the completion message and the processing result from network controller 414 and send the completion message and the processing result to BMS controller 202. Further, device controller network interface 406 can be configured to send control signals to entity A 306 via network 302. Device controller network interface 406 can be configured to receive the control signals from network controller 414. The control signals may be signals which command sensor A 308 and/or actuator A 310 to operate in a certain way and/or collect data. In some embodiments, the control signals cause sensor A 308 and/or actuator A 310 to collect data. Further, the control signals may cause actuator A 310 to perform various operations. The operations may be adjust heating and/or cooling in a building, run fans, compressors, and motors at varying speeds, and/or any other operation.

Device controller processing circuit 408 is shown to include processor 410 and memory 412. Processor 410 can be a general purpose or specific purpose processor, an application specific integrated circuit (ASIC), one or more field programmable gate arrays (FPGAs), a group of processing components, or other suitable processing components. Processor 410 may be configured to execute computer code and/or instructions stored in memory 412 or received from other computer readable media (e.g., CDROM, network storage, a remote server, etc.).

Memory 412 can include one or more devices (e.g., memory units, memory devices, storage devices, etc.) for storing data and/or computer code for completing and/or facilitating the various processes described in the present disclosure. Memory 412 can include random access memory (RAM), read-only memory (ROM), hard drive storage, temporary storage, non-volatile memory, flash memory, optical memory, or any other suitable memory for storing software objects and/or computer instructions. Memory 412 can include database components, object code components, script components, or any other type of information structure for supporting the various activities and information structures described in the present disclosure. Memory 412 can be communicably connected to processor 410 via processing circuit 408 and can include computer code for executing (e.g., by processor 410) one or more processes described herein.

Memory 412 is shown to include network controller 414, HVAC controller 416, processing request controller 422, and database controller 430. HVAC controller 416 is shown to include control generator 418 and data collector 420. Processing request controller 422 is shown to include progress tracker 424, request handler 426, and custom request handler 428. Each of these components are described in greater detail below.

Network controller 414 is configured to control device controller network interface 406 and facilitate communication via network 208 and/or network 302 for HVAC controller 416, processing request controller 422, and/or database controller 430. In this regard, network controller 414 may contain instructions to control device controller network interface 406 to send and receive data via network 208 and/or network 308.

In this regard, network controller 414 is communicably coupled to HVAC controller 416, processing request controller 422, and database controller 430. Network controller 414 can receive a processing sub-request and/or a completion message from device controller network interface 406 and send the processing sub-request and/or completion message to processing request controller 422. Further, network controller 414 can be configured to receive a processing result from processing request controller 422 for transmission via device controller network interface 406 to BMS controller 202. Network controller can be further configured to cause device controller network interface 406 to send control signals it receives from HVAC controller 416 to entity A 306. Further, network controller 414 can send any data (e.g., collected data) it receives from entity A 306 via device controller network interface 406 to HVAC controller 416.

HVAC controller 416 can be configured to collect data from entity A 306 and send control instructions to entity A 306. As shown, HVAC controller 416 is shown to include control generator 418 and data collector 420. Control generator 418 can be configured to generate control signals for entity A 306. Control generator 418 may communicate with the entity A 306 via network controller 414, device controller network interface 406 and network 302, as described further with reference to FIG. 3. Control generator 418 may be configured to receive temperature setpoints and humidity setpoints via a user interface, from BMS controller 202, from user device 210, and/or any other device. In some embodiments, control generator 418 provides a control signal to entity A 306 via network controller 414 and/or device controller network interface 406. The control signal may cause the entity A 306 to condition and/or heat a zone and/or building to a setpoint temperature. Further, the control signals may cause entity A 306 to achieve a humidity value in a building and/or zone based on a humidity setpoint.

Control generator 418 may use any of a variety of control algorithms (e.g., state-based algorithms, extremum-seeking control algorithms, PID control algorithms, model predictive control algorithms, feedback control algorithms, etc.) to determine appropriate control actions for entity A 306 as a function of temperature and/or humidity. For example, if the ambient temperature is above a temperature set point, control generator 418 may determine that a cooling coil and/or a fan should be activated to decrease the temperature of an supply air delivered to a building zone. Similarly, if the temperature is below the temperature set point, control generator 418 may determine that a heating coil and/or a fan should be activated to increase the temperature of the supply air delivered to the building zone. Control generator 418 may determine that a humidification or dehumidification component of entity A 306 should be activated or deactivated to control the ambient relative humidity to a humidity set point for a building zone.

In some embodiments control generator 418 can generate and send control signals to entity A 306 which cause entity A 306 to send data to control generator 418. In this regard, control generator 418 may be configured to start and end a data trend for entity A 306. For example, control generator 418 can be configured to send a command to entity A 306 which causes entity A 306 to begin periodically sending a data point to control generator 418. Further, control generator 418 can be configured to send a command to entity A 306 which causes entity A 306 to stop and/or pause sending the data points periodically to control generator 418.

Data collector 420 can be configured to receive and aggregate data received from entity A 306. Further, data collector 420 can be configured to cause database controller 430 to store any collected and/or aggregated data in database A 214. In this regard, data collector 420 may provide database controller 430 with the identity of the entity that is has collected the data from (e.g., sensor A 308 of entity A 306), and the collected and/or aggregated data (e.g., time-series data). Data collector 420 can be configured to receive pushed data from entity A 306 in addition to data control generator 418 has queried entity A 306 for. In various embodiments, data collector 420 extracts a timestamp from the collected data it receives from entity A 306. In this regard, data collector 420 may cause database controller 430 to store the collected data based on time. In some embodiments, if the collected data does not include a timestamp, data collector 420 can generate a time stamp based on a system clock and cause database controller 430 to store the collected data based on the timestamp generated for the collected data. The time stamp may be a time stamp for a single data point (e.g., the first data point of a series of data points), and/or time stamps for one or more data points for a time-series data set.

Referring now to processing request controller 422, processing request controller 422 can be configured to receive a processing sub-request from BMS controller 202 and generate a processing result based on the processing sub-request. Further, once the processing result has been generated, processing request controller 422 can be configured to send a completion message to BMS controller 202. Processing request controller 422 is shown to include progress tracker 424, request handler 426, and custom request handler 428. Processing request controller 422 can be communicably coupled to network controller 414 and database controller 430. In this regard, processing request controller 422 can be configured to receive a processing sub-request from network controller 414 originating from BMS controller 202. Further, processing request controller 422 can send a completion message and/or a processing result to network controller 414 for transmission to BMS controller 202 via network controller 414, device controller network interface 406, and/or network 208.

Progress tracker 424 can be configured to monitor the progress of request handler 426 and/or custom request handler 428. Progress tracker 424 can be configured to monitor the status of generating the processing result. In this regard, progress tracker 424 can be communicably coupled to request handler 426 and custom request handler 428. In the event that request handler 426 and/or custom request handler 428 generates a processing result for a processing sub-request, progress tracker 424 may generate a completion message and send the completion message to network controller 414 for transmission to BMS controller 202. In various embodiments, progress tracker 424 stores the processing result after request handler 426 and/or custom request handler 428 generate the processing result. In response to receiving a retrieval message, progress tracker 424 may send the processing result to network controller 414 for transmission to BMS controller 202.

In some embodiments, progress tracker 424 receives processing sub-requests from network controller 414 and queues the processing sub-requests. Based on the queue and the current activity of request handler 426 and/or custom request handler 428, progress tracker 424 can distribute processing sub-requests to request handler 426 and/or custom request handler 428. Progress tracker 424 may send the processing sub-request to at least one of request handler 426 and custom request handler 428 when a processing sub-request reaches the top of the queue and request handler 426 and/or custom request handler 428 has finished and/or is not generating a processing result for a processing sub-request.

In some embodiments, progress tracker 424 can be configured to select one of request handler 426 and/or custom request handler 428 to generate a processing result for a processing sub-request. In this regard, progress tracker 424 may identify that to generate a processing result for a processing sub-request, one or more custom operations may need to be performed. For this reason, progress tracker 424 may cause the custom request handler 428 to generate the processing result for the processing sub-request requiring one or more custom processing operations.

Request handler 426 can be configured to generate a processing result based on a processing sub-request. In some embodiments, request handler 426 receives a processing sub-request which indicates an entity (e.g., sensor A 308 of entity A 306) to process data for, a segment of time of the data stored for the entity (e.g., last twenty four hours, within a window of time, etc.), and one or more operations. In this regard, request handler 426 can be configured to retrieve and parse time series data 404 from database A 214 based on entity identifier 402. In some embodiments, request handler 426 can cause database controller 430 to query database A 214 for time-series data 404 for a predefined window based on entity identifier 402, this data may be sent to request handler 426 and may otherwise be known as entity data herein.

Based on the received entity data and the processing sub-request, request handler 426 can be configured to perform one or more processing operations. In some embodiments, the processing sub-request causes request handler 426 to perform one or more pipeline operations. Pipeline operations may be sequential operations in which the result of one operation can be used as an input in a subsequent operation. The operations may be various operations such as a cleanse operation, a fill operation, an aggregate operation, a math operation, a logical operation, a statistical operation, and/or any other operation. Based on the one or more operations indicated by the processing sub-request, request handler 426 can generate the processing result with one or more of the various operations and can store the result in progress tracker 424.

Custom request handler 428 can be configured to perform some and/or all of the operations of request handler 426. Custom request handler 428 can be configured to perform custom processing operations. In this regard, custom request handler 428 can receive a message containing a new operation from at least one of user device 210 and/or BMS controller 202. In some embodiments, BMS controller 202 sends the new operation to device controller A 212 after it receives the new operation from user device 210.

Custom request handler 428 can be configured to communicate with request handler 426 to perform a custom operation when a processing sub-request requires a custom operation to be performed. In this regard, custom request handler 428 can relay the operation instructions to request handler 426 so that request handler 426 can perform the custom operations in place of custom request handler 428. In various embodiments, request handler 426 can cause custom request handler 428 to perform one or more operations in place of request handler 426 but send the processing result back to request handler 426 for further processing. As an example, request handler 426 may receive pipeline instructions in a processing sub-request. The instructions may be to cleanse data, perform a custom operation on the result of the cleansed data, and then add an offset to the result of the custom operation. In this regard, request handler 426 may perform the first instruction, cleansing the data. Then, request handler 426 may send the result of the cleansed data to custom request handler 428 so that custom request handler 428 can perform the custom operation on the cleansed data. Then, custom request handler 428 can be configured to send the request handler 426 so that request handler 426 can add the offset to the result of the custom operation. In some embodiments, request handler 426 and custom request handler 428 are a single entity and/or software function. In this regard, sending data between request handler 426 and custom request handler 428 may not be necessary.

Referring now to database controller 430, database controller 430 can be configured to receive a data request from processing request controller 422 and retrieve time-series data (e.g., time-series data 404) and send the time-series data to processing request controller 422. In this regard, database controller 430 can be configured to send the retrieved data to processing request controller 422. In some embodiments, processing request controller 422 indicates a time window for the retrieved time-series data. In this regard, database controller 430 may parse the data with the time window before sending the retrieved data to processing request controller 422.

Figure 5:
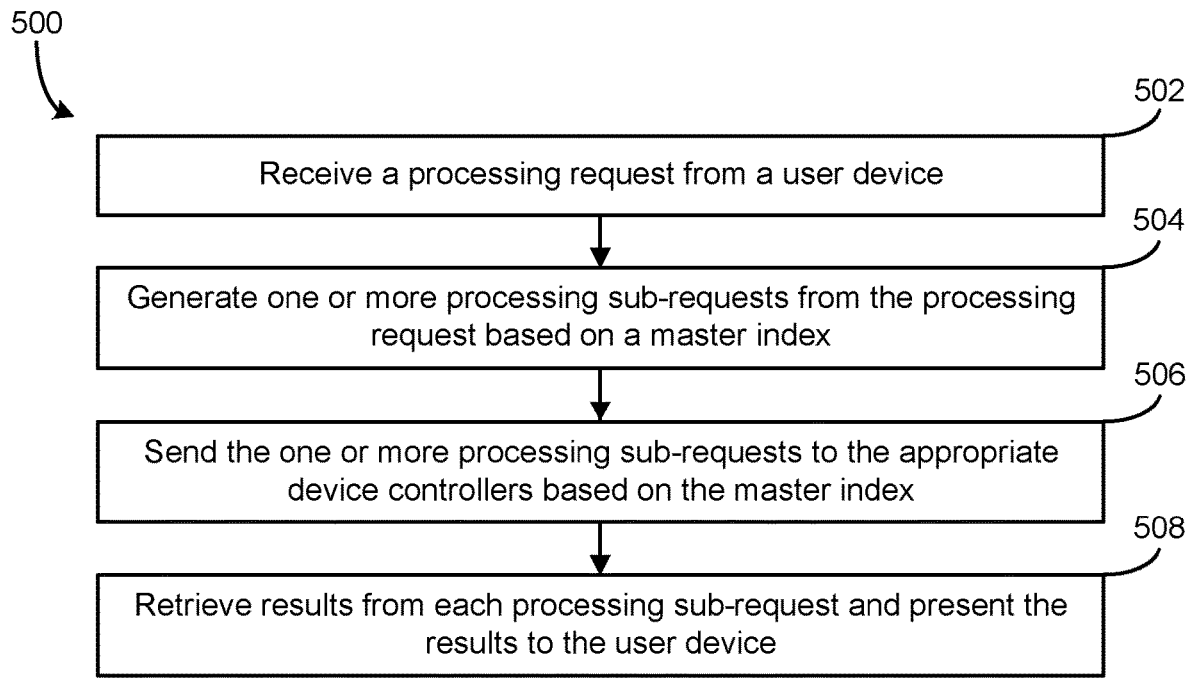
FIG. 5 is a flow diagram illustrating a process for distributing data processing with the BMS controller of FIG. 2 and FIG. 3, according to an exemplary embodiment.

Referring now to FIG. 5, a flow diagram of process 500 is shown for generating sub-processing requests by a BMS controller, according to an exemplary embodiment. In some embodiments, process 500 can be performed by BMS controller 202. However, it should be understood that any computing device, controller, or entity of system 200 as described with reference to FIGS. 2-4 may perform process 500.

BMS controller 202 can receive a processing request from user device 210 via device controller 320 (step 502). The processing request may be received by device controller 320 directly from user device 210 (e.g., adhoc via network interface 318). In some embodiments, the processing request is received from user device 210 via a network (e.g., network 208 and network interface 318). Further, device controller 320 can receive processing requests from device controller A 212 and/or device controller B 216. In various embodiments, the processing request received by device controller 320 can be performed by a single device controller of system 200 or must be performed by one or more device controllers of system 200. In this regard, BMS controller 202 must split the processing request into one or more processing sub-requests. For example, a processing request may be a request for the zone temperatures in Zone A and Zone B of a building at a specific time. The zone temperature data for Zone A may be stored in database A 214 of device controller A 212 while the zone temperature data for Zone B may be stored in database B 218 of device controller B 212. In this regard, to determine the average zone temperatures of Zone A and Zone B, two separate processing sub-requests may need to be performed by device controller A and device controller B 216.

If the processing request must be performed by multiple device controllers of system 200, request distributor 322 can be configured to generate one or more processing sub-requests (step 504) based on the processing request received in step 502. Request distributor 322 may use master-index 206 to determine if the processing request must be performed by multiple device controllers of system 200. In this regard, request distributor 322 can be configured to identify which device controllers (e.g., device controller A 212, device controller B 216, etc.) and/or database (e.g., database A 214, database B 218, etc.) are responsible for and/or store the data necessary for generating processing results for the processing request. In response to determining that the data necessary for generating the processing result is stored across multiple databases, request distributor 322 generates an appropriate number of sub-processing requests. The appropriate number of sub-processing requests may be based on the number of databases that the data is stored across. For example, if the data necessary for generating a processing result is stored across three different databases, request distributor 322 can generate three separate sub-processing requests and send the sub-processing requests to the device controllers coupled to the three different databases.

The one or more processing sub-requests can be sent by request distributor 322 via network interface 318 to one or more identified device controllers (step 506). The "identified device controllers" may be the device controllers that are necessary for generating a processing results for one or more processing sub-requests, as identified in step 504. In this regard, request distributor 322 can identify, based on the master-index 206, the controllers coupled to the databases storing the data necessary for the processing sub-request and/or responsible for processing the data stored in the database. Request distributor 322 can transmit the processing sub-requests to the identified device controllers of system 200 via network 208.

Each processing result generated by the device controllers of system 200 (e.g., the processing results generated for the one or more processing sub-requests can be retrieved from the device controllers by response composer 326 via network 208 (step 508). In some embodiments, response composer 326 receives a completion message from one or more of the device controllers that request distributor 322 has sent a processing sub-request to. In this regard, once response composer 326 receives the completion message, response composer 326 can be configured to pick up and/or send a message to retrieve the processing results to the device controllers that have generated the processing result. In various embodiments, response composer 326 queues one or more processing requests and only retrieves the processing results to fulfill one (e.g., the highest processing request) in the queue. In some embodiments, the retrieval message that response composer 326 sends to one or more of the device controllers causes the device controller to respond by sending the processing result to response composer 326 via network 208 and network interface 318.

Figure 6:
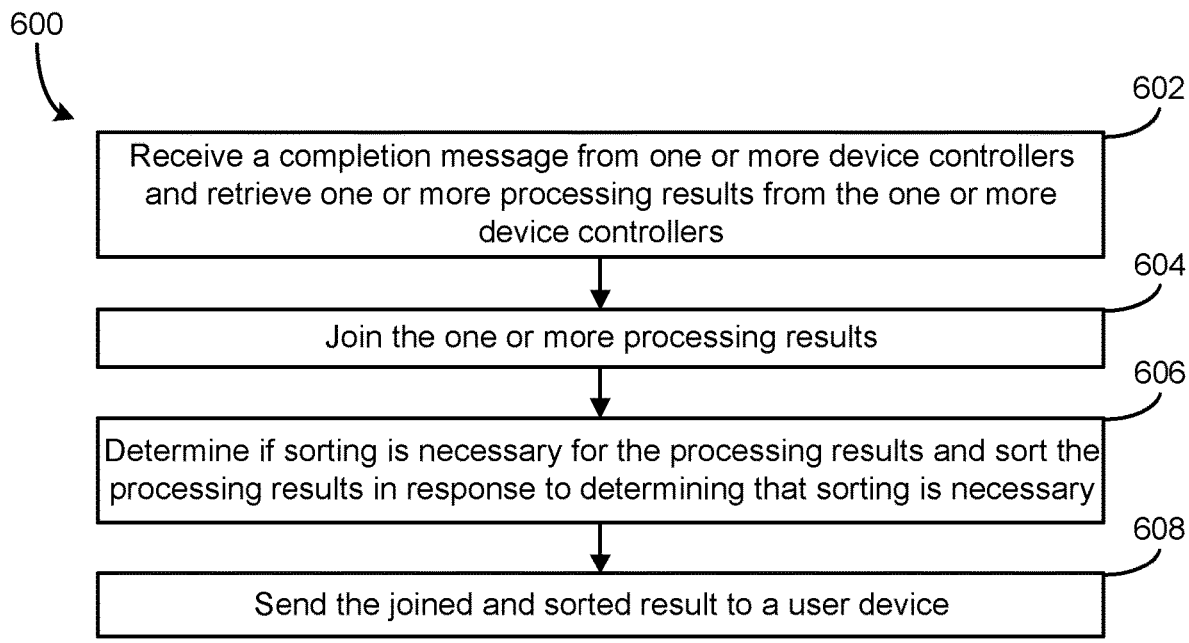
FIG. 6 is a flow diagram illustrating a process for retrieving processing results and combining the processing results with the BMS controller of FIG. 2 and FIG. 3, according to an exemplary embodiment.

Referring now to FIG. 6, a flow diagram of process 600 is shown for generating the joined result by a BMS controller, according to an exemplary embodiment. In some embodiments, process 500 can be performed by the various components of BMS controller 202. However, it should be understood that any computing device, controller, or entity of system 200 as described with reference to FIGS. 2-4 may perform process 500.

Response composer 326 receives a completion message from device controller A 212 and/or device controller B 216 (step 602). In some embodiments, step 602 is the same as step 508 as described with reference to FIG. 5 and/or includes some and/or all of the steps of process 500 as described with reference to FIG. 5. In response to receiving the completion message, response composer 326 can retrieve the results of a processing sub-request from the device controller from which the completion message originated. In this regard, the completion message may identify the device controller. Based on this identifier, response composer 326 can send a retrieval message to the device controller causing the device controller to send the result of a the processing sub-request to the response composer 326.

Response composer 326 can be configured to join the one or more received processing results (step 604). In some embodiments, joining the processing results may include combining the processing results into a single data entity and/or data element. Joining the processing results may further include concatenating the processing results, averaging the processing results, and/or any other data operation or manipulation. In some embodiments, response composer 326 can perform and or more operations on the combined processing results. These operations are described further with reference to FIGS. 9A-9B.

Response composer 326 can be configured to determine if sorting is necessary for the received processing results (step 606). In some embodiments, sorting may be performed by response composer 326 before and/or after joining the processing results in step 602. In some embodiments, sorting may include grouping the processing results into one or more groups. For example, request distributor 322 may receive three processing requests which are independent from each other. Each processing request may be used to generate two processing sub-requests for a total of six processing sub-requests. Once response composer 326 has received the processing results for the six processing sub-requests, response composer may group each response for the three processing requests into one of three groups, each group including only processing results related to one of the processing requests. In various embodiments, sorting the processing results may be sorting the results by time. For example, before concatenating two processing results containing time-series temperature data from 3 P.M. to 4 P.M. and 1 P.M. to 2 P.M., the 1 P.M. to 2 P.M. time series data may be placed "before" the 3 P.M. to 4 P.M. data so that the concatenated result is time series temperature data from 1 P.M. to 4 P.M. In various embodiments, placing one data set "before" a second data set may be changing the array indexes for one set of data to be lower than the array indexes for a second set when a single dimensional array is used to store the data. For example, a first set (4, 5, 6) must be placed "before" a second set (1, 2, 3), the result would be, (1, 2, 3, 4, 5, 6).

Once the processing results have been sorted and/or joined if necessary, response composer 326 can be configured to send the joined and/or sorted result, referred to in FIGS. 2-3 as the joined result, to user device 210. In some embodiments, response composer 326 sends the joined results to device controller 320 for transmission to user device 210. In various embodiments, device controller 320 may manipulate the data and/or otherwise generate data representative of the joined results for display and/or storage on user device 210. For example, device controller 320 may generate a time-series graph to display ambient temperatures for a zone over time. In other examples, device controller 320 can generate tables to display statistics (e.g., means, standard deviations, minimum values, maximum values, etc.) for one or more data sets. In some embodiments, device controller 320 may generate a PDF document, a Excel file, a TXT file, and/or any over file or document from the joined result that can be easily viewed on device controller 320.

Figure 7:
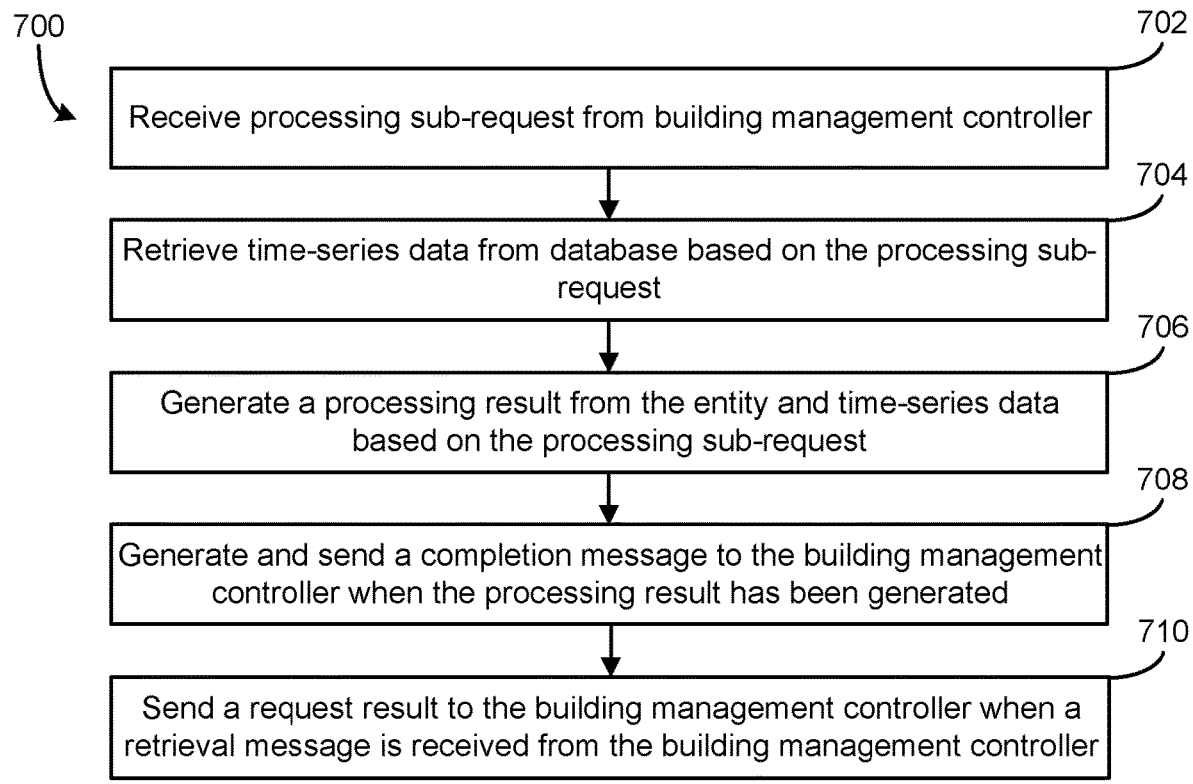
FIG. 7 is a flow diagram of a process for generating a processing results based on a processing sub-request with the device controller of FIG. 2, FIG. 3, and FIG. 4, according to an exemplary embodiment.

Referring now to FIG. 7, a flow diagram of process 700 is shown for generating a processing result for a processing sub-request by a device controller. Process 700 can be performed by device controller A 212 and is thus discussed with reference to device controller A 212 and the components of device controller A 212. However, process 700 can be performed by device controller B 216, BMS controller 202, and/or any other computing component of system 200.

Device controller A 212 (e.g., processing request controller 422) receives a processing sub-request from BMS controller 202 via network 208 (step 702). Responsive to receiving the processing sub-request, processing request controller 422 can identify one or more operations to perform. In various embodiments, the operations are selected based on identifiers and/or identifier sequences included and/or embedded in the processing sub-request. The processing sub-request may further indicate the data necessary to be processed by the one or more operations. In this regard, the data necessary to be processed may be identified by the processing sub-request with a "StartTime" identifier and an "EndTime" identifier. The StartTime and EndTime may identify a segment of data necessary for generating a processing result for the processing sub-request. In this regard, database controller 430 can retrieve time-series data 404 from database A 214 based on the StartTime and the EndTime by the processing sub-request and send the time-series data 404 to processing request controller 422 (step 704). Based on the time-series data 404 and the operations indicated by the processing sub-request, processing request controller 422 (i.e., request handler 426 and/or custom request handler 428) can be configured to generate a processing result for the time-series data 404 (step 706). In various embodiments, generating the processing result includes performing one or more operations in a predefined sequence and/or pipeline sequence as identified by the processing sub-request. In some embodiments, only a single operation is necessary.

In response to determining that the processing result has been generated, progress tracker 424 can send a completion message to BMS controller 202 (step 708). By sending the completion message to BMS controller 202, progress tracker 424 indicates to BMS controller 202 that the process result has been generated. In some embodiments, the completion message indicates to BMS controller 202 and/or contains data indicating that the processing sub-request is completed and the processing result is being held in device controller A 212 (e.g., in progress tracker 424) for a predefined amount of time and/or until BMS controller 202 retrieves the processing result.

In response to receiving a retrieval message from BMS controller 202, progress tracker 424 can be configured to send the processing result to BMS controller 202 (step 710). In some embodiments, the retrieval message causes the progress tracker 424 to send the processing result to BMS controller 202 and delete or erase the processing result from any queue or data storage structure storing the processing result. In various embodiments, upon sending the processing result to BMS controller 202, and/or for any other reason and/or at any other time, progress tracker may cause database controller 430 to store the processing result and/or a record of the processing result that BMS controller 202 may retrieve at a later time. In this regard, if BMS controller 202 receives a corrupt processing result from device controller A and/or does not receive the processing result after a predefined amount of time has passed since sending device controller a 212 a retrieval message, BMS controller can query (e.g., send a retrieval message to) device controller A 212 a second time, a third time, fourth time, etc. to retrieve the processing result stored in database A 214.

Figure 8:
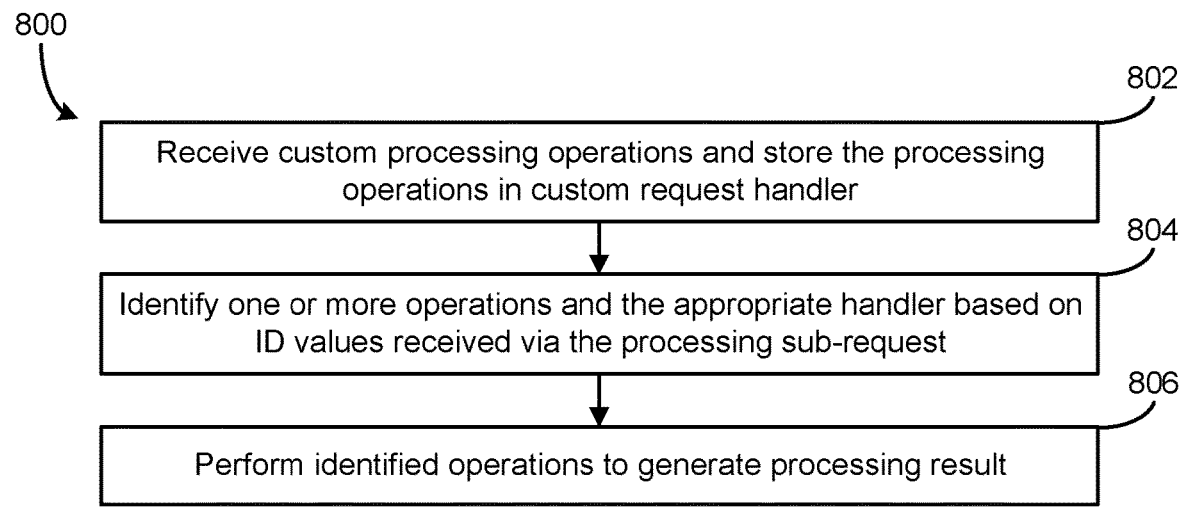
FIG. 8 is a flow diagram of a process for performing processing operations with the device controller of FIG. 2, FIG. 3, and FIG. 4, according to an exemplary embodiment.

Referring now to FIG. 8, a flow diagram of process 800 is shown for performing processing operations by a device controller, according to an exemplary embodiment. Process 800 is discussed with reference to device controller A 212 and component of device controller A 212. However, process 700 can be performed by device controller B 216, BMS controller 202, and/or any other computing component of system 200.

Processing request controller 422 can receive a custom processing operation and store the processing operation in custom request handler 428 (step 802). In this regard, processing request controller 422 can add and/or update any processing operation stored in request handler 426 and/or custom request handler 428. In some embodiments, processing request controller 422 can be configured to receive custom processing operation code and/or updated processing operation code from BMS controller 202, user device 210, device controller B 216, and/or any other component of system 200. In this regard, processing request controller 422 can store and/or install (e.g., un-package, un-compress, configure, etc.) the processing operation code and/or updated processing operation code and store the result of the installation in request handler 426 and/or custom request handler 428.

In response to receiving a processing sub-request, processing request controller 422 can be configured to identify one or more processing operations to perform, the sequence of operations to perform, the data to be used for each processing operation, and/or any other information necessary for generating a processing result for the processing sub-request (step 804). In some embodiments, each processing sub-request can be broken down into one or more processing operations by an operation identifier. Operation identifiers are described in further detail with respect to FIGS. 9A and 9B. An operation identifier may be a number or value which corresponds to a certain processing operation. For example, "18" may refer to the "Average" processing operation.

In some embodiments, processing request controller 422 can determine a sequence of processing operations to perform based on the processing sub-request. In this regard, the result of one processing operation may be an input for a subsequent processing operation, hence pipeline operations. In various embodiments, the processing sub-request may be only a single operation and/or may be multiple operations that are not pipelined. Based on the one or more operations necessary for generating the processing result, processing request controller 422 can be configured to execute the processing operations and generate the processing result (step 806).

Figure 9A:
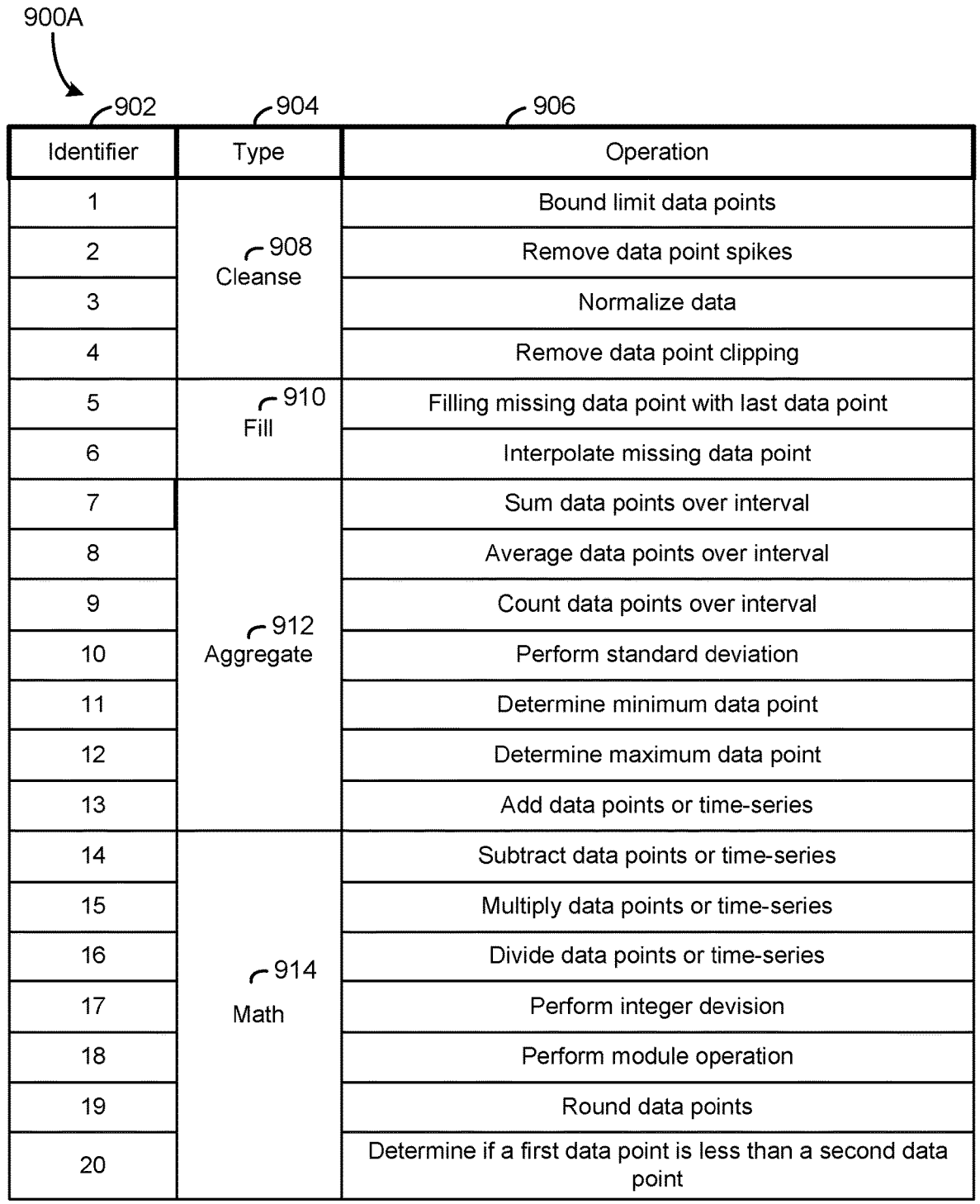

Referring now to FIGS. 9A and 9B, tables 900A and 900B are shown including various processing operations that can be performed by processing request controller 422 of device controller A 212 and/or any other computing device of system 200. In some embodiments, processing request controller 422 can perform the operations in parallel or in sequence (e.g., pipeline). The tables are shown to include an operation identifier (i.e., identifier 902), an operation type (i.e., type 904), and the operation (i.e., operation 906). According to tables 900A and 900B, eight types of processing operations are shown, however, more types of processing operations are anticipated in addition to the operation types shown. The operation types shown are cleanse 908, fill 910, aggregate 924, math 914, logical 916, statistical 918, other 920, and custom 922.

In various embodiments, cleanse operations 908 can be any time-series cleansing operations. These operations may reduce and/or remove anomaly data points. For example, various forms of data compression can be used to set an upper bound and/or a lower bound on a data set. Various fill operations 910 can cause missing data points to be filled. In this regard, a missing data point may automatically be set to be the last known data point in a time-series data set by one of the fill operations 910. Further, various aggregate operations 924 can be performed on a time-series data set. The operations may be generating an average for a time-series data set, summing data points, etc. Similarly, math operations 914 may add, subtract, multiply time-series data points and/or time-series data sets.

Logical operations 916 may include various Boolean comparisons and operations such as determining if a condition is true and performing a set operation if the condition is determined to be true. The statistical operations 918 can be used to perform various statistical calculations on time-series data points and/or time-series data sets. In this regard, percentile calculations, correlations, and other operations can be included in the statistical operations 918. In addition to these operations, other operations 920 and custom operations 922 are included in tables 900A and 900B.

An example of device controller A 212 using the operations of tables 900A and 900B is as follows, however, various other uses of the operations of tables 900A and 900B can be performed by device controller A 212. Processing request controller 422 may receive a processing sub-request that it can break down into multiple operations to process data for a specified entity between a beginning time and an end time. An example of the operations making up a single sub-request is as follows:

1. Ts1=TimeseriesAPI(EntityA, StartTime, EndTime);
2. Ts1.collect( );
3. Ts2=Ts1.holdLastValue( );
4. Ts3=Ts2.BoundsLimitingCleanse(85,75);

The first and second steps in the sequence may cause database A to retrieve time-series data 404 for a specific entity within a predefined time window, that is, between a start-time and an end-time. The third step, may cause any missing values in time series data 404 to be filled. The fourth step may cause the result of the third step to be bound limited. In the first two steps, data for a specific entity such as a temperature sensor may be retrieved. For example, "Ts1" may be equal to (90, 79, NaN, 70). The term "NaN" may refer to "not a number" and may indicate that there is a missing data point. In the third step, performing "holdLastValue" as identified by identifier 4, may cause any missing time-series data point to be filled with the last time-series data point. For example, "Ts2" may be equal to (90, 79, 79, 70). In the fourth step, the operation "BoundsLimitingCleanse" may be performed on "Ts2." This operation may cause an upper bound (e.g., 85) and a lower bound (e.g., 75) to be applied to "Ts2." "Ts3" may equal to (85, 79, 79, 75).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) comprising:
a plurality of device controllers, each configured to monitor and control one or more heating, ventilation, or air conditioning (HVAC) devices and to store and process time-series data associated with the one or more HVAC devices;
a BMS controller communicably coupled to the plurality of device controllers, wherein the BMS controller is configured to:
generate and send one or more processing sub-requests to at least one of the plurality of device controllers based on a processing request associated with the time-series data associated with an HVAC device, the one or more processing sub-requests defining one or more operations and causing the plurality of device controllers to perform the one or more operations on the time-series data to generate one or more processing results;
receive the one or more processing results from the at least one of the plurality of device controllers;
join the one or more processing results into a joined result; and
provide the joined result to a requesting entity;
wherein the plurality of device controllers are configured to receive and process processing sub-requests and send results to the BMS controller.

2. The system of claim 1, the system further comprising a BMS database configured to store a master-index, the master-index identifying the time-series data stored by the plurality of device controllers, wherein the BMS controller is further configured to:
query the master-index of the BMS database to determine which of the plurality of device controllers store the time-series data associated with the HVAC device; and
send the one or more processing sub-requests to the plurality of device controllers storing the time-series data.

3. The system of claim 1, wherein receiving the one or more processing results comprises:
receiving a completion message from the at least one of the plurality of device controllers; and
retrieving the one or more processing results responsive to receiving the completion message.

4. The system of claim 1, the BMS controller further configured to sort the one or more processing results responsive to a determination that the one or more processing results require sorting.

5. The system of claim 1, wherein the processing request requests time-series data associated with a plurality of HVAC devices.

6. The system of claim 1, wherein the plurality of device controllers each comprise a device database and are further configured to:
store the time-series data in device databases; and
query the device databases responsive to receiving a processing sub-request to obtain the time-series data to fulfill the processing sub-request.

7. A building management system (BMS) comprising:
a plurality of device controllers comprising a plurality of processing circuits configured to:
receive a processing sub-request from a BMS controller associated with time-series data of a particular heating, ventilation, or air conditioning (HVAC) device, the processing sub-request defining one or more operations and causing a device controller to perform the one or more operations on the time-series data to generate a processing result;
obtain the time-series data of the particular HVAC device;
perform the one or more operations on the time-series data;
generate the processing result including results of the one or more operations; and
send the processing result to the BMS controller;
wherein the BMS controller is configured to join processing results from each of the plurality of device controllers.

8. The system of claim 7, wherein the plurality of device controllers further comprise device databases configured to store the time-series data of one or more HVAC devices, wherein obtaining the time-series data of the particular HVAC device comprises querying a device database for the time-series data of the particular HVAC device.

9. The system of claim 7, the plurality of processing circuits further configured to:
generate and send a completion message to the BMS controller responsive to generating the processing results; and
receive a retrieval message from the BMS controller, wherein the processing result is sent to the BMS controller responsive to receiving the retrieval message.

10. The system of claim 7, the one or more operations associated with a plurality of operation identifiers corresponding to particular processing operations.

11. The system of claim 7, the plurality of processing circuits further configured to:

generate control signals to operate the particular HVAC device; and provide the control signals to the particular HVAC device;

wherein the time-series data of the particular HVAC device is obtained responsive to operating the particular HVAC device based on the control signals.

12. The system of claim 7, the plurality of processing circuits further configured to:

receive a plurality of processing sub-requests from the BMS controller;

generate a queue comprising the plurality of processing sub-requests; and perform one or more particular processing operations indicated by the plurality of processing sub-requests respective of the queue.

13. The system of claim 7, the plurality of processing circuits further configured to:

receive user defined processing operations from the BMS controller and store the user defined processing operations; and perform one or more of the user defined processing operations to generate the processing result when the processing sub-request indicates that one or more of the user defined processing operations are required for generating the processing result.

14. A device controller for one or more heating, ventilation, or air conditioning (HVAC) devices, the device controller comprising:

one or more processing circuits comprising one or more processors and memory storing instructions that, when executed by the one or more processors, cause the one or more processors to perform operations comprising:

storing time-series data in a database, the time-series data describing operation of the one or more HVAC devices;

receiving a processing sub-request from a building management system (BMS) controller, the processing sub-request associated with the time-series data, wherein the processing sub-request is one of a plurality of processing sub-requests provided by the BMS controller to a plurality of device controllers, the processing sub-request defining one or more operations and causing the device controller to perform the one or more operations on the time- series data to generate a processing result;

retrieving the time-series data from the database;

performing the one or more operations indicated by the processing sub-request on the time-series data to generate the processing result; and transmitting the processing result to the BMS controller to fulfill the processing sub-request.

15. The device controller of claim 14, the operations further comprising:

generating and sending a completion message to the BMS controller responsive to generating the processing result; and receiving a retrieval message from the BMS controller, wherein the processing result is transmitted to the BMS controller responsive to receiving the retrieval message.

16. The device controller of claim 14, wherein the one or more operations are associated with a plurality of operation identifiers corresponding to particular processing operations to perform.

17. The device controller of claim 14, the operations further comprising:

generating control signals to operate the one or more HVAC devices;

providing the control signals to the one or more HVAC devices; and obtaining the time-series data responsive to operating the one or more HVAC devices based on the control signals.

18. The device controller of claim 14, the operations further comprising:

receiving a particular plurality of processing sub-requests from the BMS controller;

generating a queue comprising the plurality of processing sub-requests; and performing processing operations indicated by the plurality of processing sub-requests respective of the queue.

19. The device controller of claim 14, wherein the time-series data is retrieved from the database based on an entity identifier that identifies the time-series data associated with the one or more HVAC devices.

20. The device controller of claim 14, wherein the processing result is one of a plurality of processing results that are joined by the BMS controller to generate a joined result.

* * * * *